(12) United States Patent
Portune et al.

(10) Patent No.: US 12,460,552 B1
(45) Date of Patent: Nov. 4, 2025

(54) SEALING SYSTEM FOR A TURBOMACHINE

(71) Applicant: General Electric Company, Schenectady, NY (US)

(72) Inventors: Grant Robert Portune, Cincinnati, OH (US); Steven Douglas Johnson, Milford, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/654,631

(22) Filed: May 3, 2024

(51) Int. Cl.
*F01D 11/00* (2006.01)
*F01D 11/16* (2006.01)

(52) U.S. Cl.
CPC ............ *F01D 11/001* (2013.01); *F01D 11/16* (2013.01); *F05D 2260/38* (2013.01)

(58) Field of Classification Search
CPC .... F01D 11/001; F01D 11/02; F05D 2240/55; F05D 2260/38
See application file for complete search history.

(56) References Cited

U.S. PATENT DOCUMENTS

| | | | |
|---|---|---|---|
| 4,251,185 A | 2/1981 | Karstensen | |
| 4,815,933 A * | 3/1989 | Hansel | F01D 9/042 415/189 |
| 5,746,573 A * | 5/1998 | Junkin | F01D 11/005 415/115 |
| 6,065,756 A | 5/2000 | Eignor et al. | |
| 6,095,750 A * | 8/2000 | Ross | F01D 9/042 415/174.4 |
| 6,558,114 B1 * | 5/2003 | Tapley | F01D 5/081 415/231 |
| 7,238,003 B2 * | 7/2007 | Synnott | F01D 11/003 29/889.22 |
| 7,507,069 B2 * | 3/2009 | Kizuka | F01D 11/025 415/199.5 |
| 8,133,014 B1 | 3/2012 | Ebert et al. | |
| 8,961,108 B2 * | 2/2015 | Bergman | F01D 25/246 415/115 |
| 9,051,846 B2 | 6/2015 | Arilla et al. | |
| 9,109,458 B2 * | 8/2015 | Alvanos | F01D 11/001 |
| 10,683,758 B2 * | 6/2020 | Sehra | F01D 5/082 |
| 2012/0248704 A1 | 10/2012 | Fennell et al. | |
| 2022/0389825 A1 | 12/2022 | Johnson et al. | |

FOREIGN PATENT DOCUMENTS

| | | |
|---|---|---|
| CN | 114483801 A | 5/2022 |
| FR | 3049980 A1 | 10/2017 |
| FR | 3067057 A1 | 12/2018 |

* cited by examiner

*Primary Examiner* — Nathaniel E Wiehe
*Assistant Examiner* — Jason G Davis
(74) *Attorney, Agent, or Firm* — Dority & Manning, P.A.

(57) ABSTRACT

A turbomachine comprises a nozzle segment including an inner shroud defining a bottom surface and a nozzle flange defining a forward side surface and an aft side surface. A floating rotor seal is coupled to the nozzle flange via a carrier flange. The carrier flange includes a forward wall and an aft wall. The nozzle flange is positioned between the forward and aft walls and a flowpath is defined therebetween. A seal pocket is defined in one of the forward wall or the aft wall and is in fluid communication with the flowpath. At least one linear seal segment is partially disposed within the seal pocket. The linear seal segment is configured to form a seal against the nozzle flange or the bottom surface in response to pressurization of the seal pocket via a working fluid in the flowpath.

15 Claims, 10 Drawing Sheets

SEALING SYSTEM FOR A TURBOMACHINE

FIELD

The present disclosure relates to a gas turbine engine having a turbomachine. More particularly, this disclosure is directed to a sealing system for turbomachine of a gas turbine engine.

BACKGROUND

A gas turbine engine generally includes, in serial flow order, a compressor section, a combustion section, and a turbine section. At least one rotor shaft extends axially through the compressor section, the combustion section, and the turbine section. During operation, compressed air for cooling and combustion, and combustion gases are routed through various flow paths defined within the gas turbine engine. Leakage or backflow of the compressed air or the combustion gases into certain areas of the gas turbine engine may negatively affect engine component life and engine efficiency.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
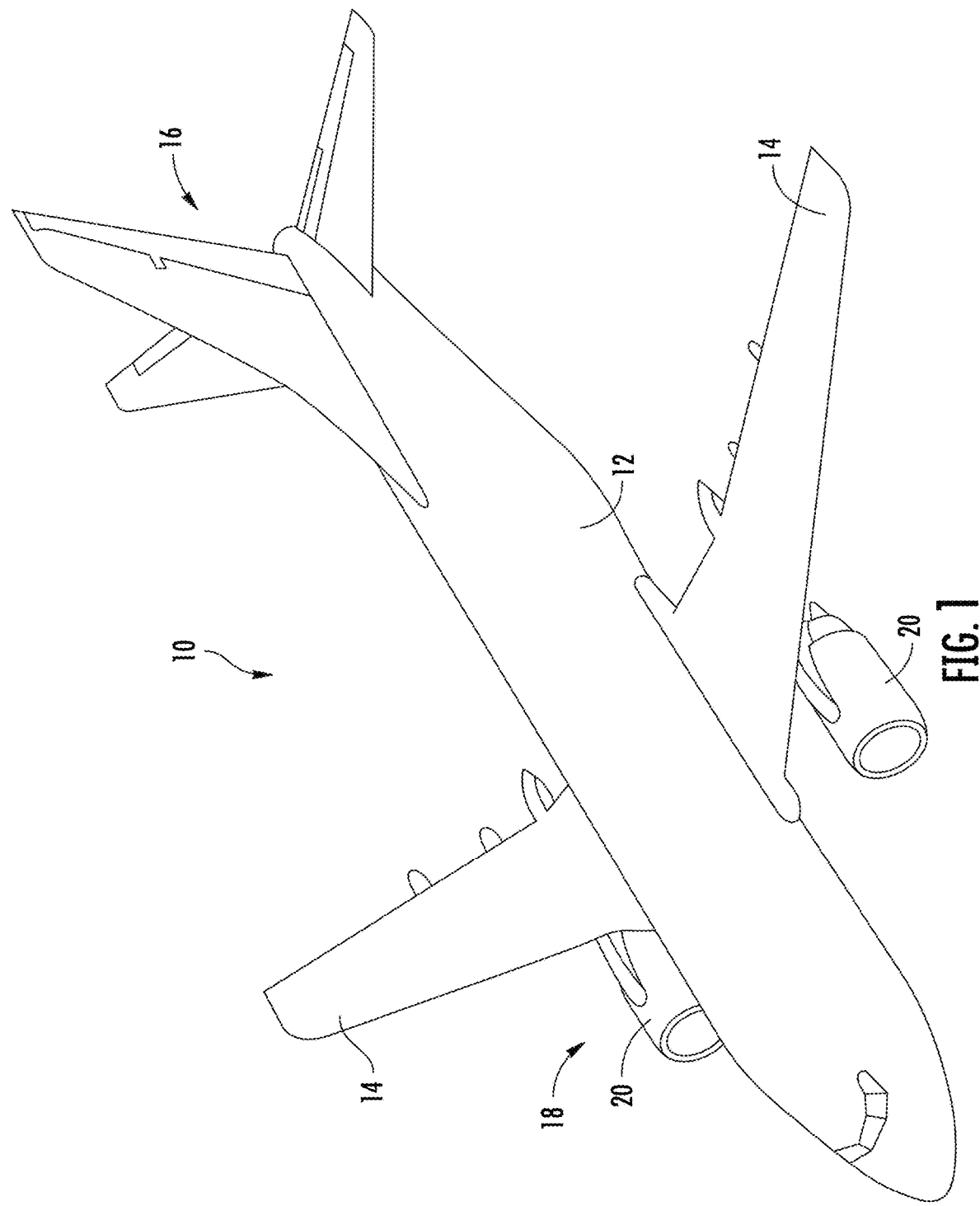
FIG. 1 is a perspective view of an exemplary aircraft in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

The terms "forward" and "aft" refer to relative positions within a gas turbine engine or vehicle and refer to the normal operational attitude of the gas turbine engine or vehicle. For example, regarding a gas turbine engine, forward refers to a position closer to an engine inlet and aft refers to a position closer to an engine nozzle or exhaust.

The various embodiments illustrated and described herein provide a sealing system for a gas turbine engine. The sealing system includes a plurality of linear seal segments arranged end-to-end annularly about a longitudinal centerline of the gas turbine engine and at least partially disposed within a respective seal pocket. The linear seal segments are disposed between axially adjacent stationary components, such as but not limited to, a nozzle flange and a carrier flange of nozzle segment, or a turbine blade shroud and an outer shroud of a turbine nozzle segment. The system may include single or multiple linear seal segments per stationary component, may be of different lengths, heights, stiffness, and angled them to make room for a taller seal pocket, or to bring the piston bars inward at ends of each adjacent stationary component.

The linear seal segments use linear contact to seal between the stationary components. The linear seal segments move dynamically with each respective individual nozzle segment or stationary component to maintain a continuous seal during operation of the gas turbine engine using pressure delta across the linear seal segments to load the linear seal segments against a respective contact surface. A spring bias member such as a wave spring may be used to preload or bias the linear seal segments towards a respective sealing surface. The linear seal segments may be used to seal forward or aft of the nozzle flange and may be configured to seal axially or radially.

Referring now to the drawings, FIG. 1 is a perspective view of an aircraft 10 that may incorporate at least one exemplary embodiment of the present disclosure. As shown in FIG. 1, the aircraft 10 has a fuselage 12, wings 14 attached to the fuselage 12, and an empennage 16. The aircraft 10 further includes a propulsion system 18 that produces a propulsive thrust to propel the aircraft 10 in flight, during taxiing operations, etc. Although the propulsion system 18 is shown attached to the wings 14, in other embodiments it may additionally or alternatively include one or more aspects coupled to other parts of the aircraft 10, such as, for example, the empennage 16, the fuselage 12, or both.

The propulsion system 18 includes at least one engine. In the exemplary embodiment shown, the aircraft 10 includes a pair of gas turbine engines 20. Each gas turbine engine 20 is mounted to aircraft 10 in an under-wing configuration. Each gas turbine engine 20 is capable of selectively generating propulsive thrust for the aircraft 10. The gas turbine engines 20 may be configured to burn various forms of fuel including, but not limited to unless otherwise provided, jet fuel/aviation turbine fuel, and hydrogen fuel.

Figure 2:
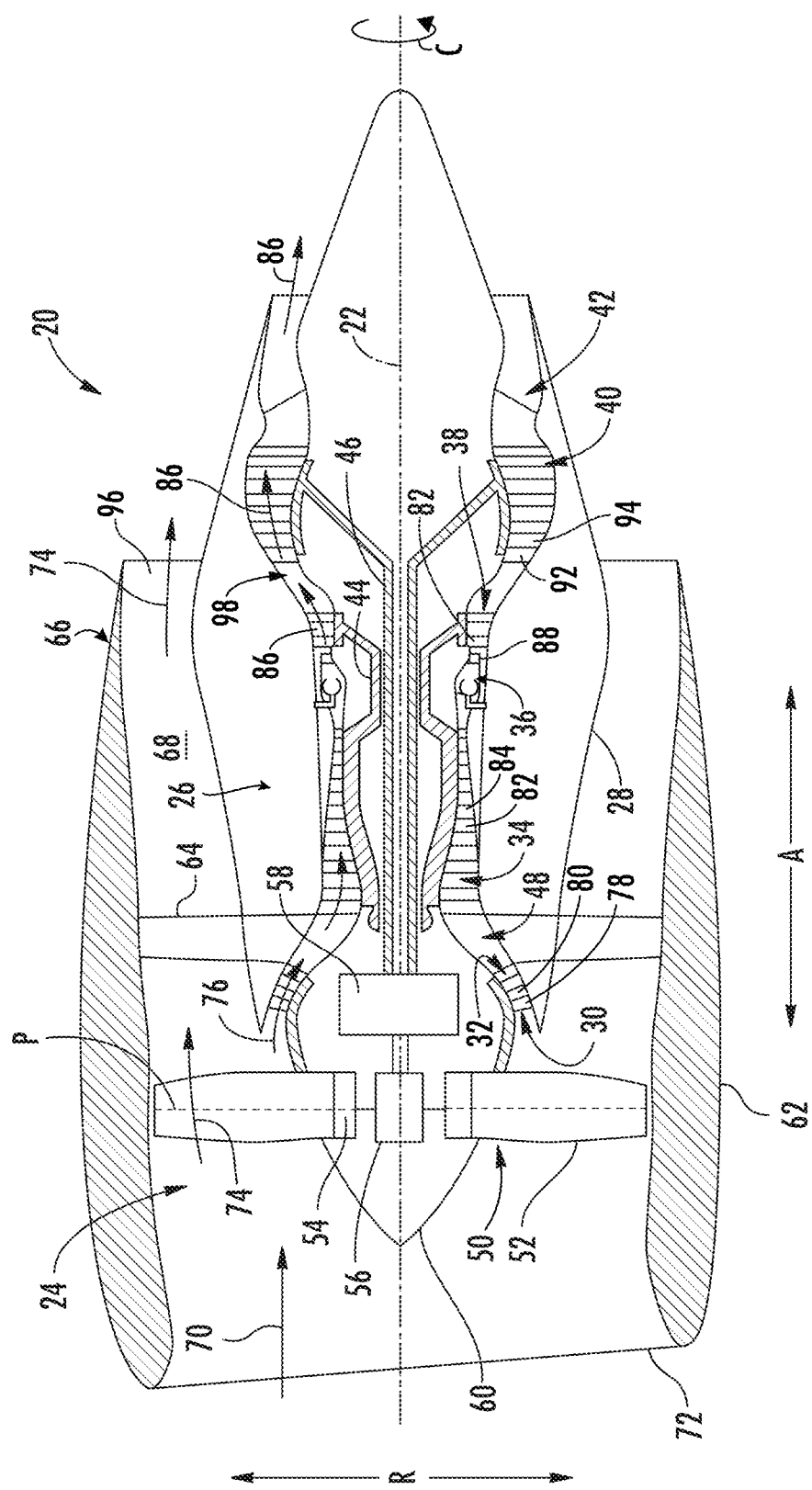
FIG. 2 is a cross-sectional schematic view of a gas turbine engine including a turbomachine in accordance with an exemplary aspect of the present disclosure.

FIG. 2 is a cross-sectional side view of a gas turbine engine 20 in accordance with an exemplary embodiment of the present disclosure. More particularly, for the embodiment of FIG. 2, the gas turbine engine 20 is a multi-spool, high-bypass turbofan jet engine, sometimes also referred to as a "turbofan engine." As shown in FIG. 2, gas turbine engine 20 defines an axial direction A (extending parallel to a longitudinal centerline 22 provided for reference), a radial direction R, and a circumferential direction C extending about the longitudinal centerline 22. In general, the gas turbine engine 20 includes a fan section 24 and a turbomachine 26 disposed downstream from the fan section 24.

The turbomachine 26 depicted generally includes an outer casing 28 that defines an annular core inlet 30. The outer casing 28 at least partially encases, in serial flow relationship, an axial compressor section including a booster or low-pressure compressor 32 and a high-pressure compressor 34, a combustion section 36, a turbine section including a high-pressure turbine 38, a low-pressure turbine 40, and a jet exhaust nozzle 42.

A high-pressure shaft 44 drivingly connects the high-pressure turbine 38 to the high-pressure compressor 34. A low-pressure shaft 46 drivingly connects the low-pressure turbine 40 to the low-pressure compressor 32. The low-pressure compressor 32, the high-pressure compressor 34, the combustion section 36, the high-pressure turbine 38, the low-pressure turbine 40, and the jet exhaust nozzle 42 together define a working gas flow path 48 through the gas turbine engine 20.

For the embodiment depicted, fan section 24 includes a fan 50 having a plurality of fan blades 52 coupled to a disk 54 in a spaced apart manner. As depicted, the fan blades 52 extend outwardly from disk 54 generally along the radial direction R. Each fan blade 52 is rotatable with the disk 54 about a pitch axis P by virtue of the fan blades 52 being operatively coupled to a pitch change mechanism 56 configured to collectively vary the pitch of the fan blades 52, e.g., in unison.

The gas turbine engine 20 further includes a power gear box 58. The fan blades 52, disk 54, and pitch change mechanism 56 are together rotatable about the longitudinal centerline 22 by the low-pressure shaft 46 across the power gear box 58. The power gear box 58 includes a plurality of gears for adjusting the rotational speed of the fan 50 relative to a rotational speed of the low-pressure shaft 46, such that the fan 50 and the low-pressure shaft 46 may rotate at more efficient relative speeds.

Referring still to the exemplary embodiment of FIG. 2, the disk 54 is covered by rotatable front hub 60 of the fan section 24 (sometimes also referred to as a "spinner"). The front hub 60 is aerodynamically contoured to promote airflow through the plurality of fan blades 52. Additionally, the fan section 24 includes an annular fan casing or outer nacelle 62 that circumferentially surrounds the fan 50 and/or at least a portion of the turbomachine 26. The outer nacelle 62 is supported relative to the turbomachine 26 by a plurality of circumferentially spaced struts or outlet guide vanes 64 in the embodiment depicted. Moreover, a downstream section 66 of the outer nacelle 62 extends over an outer portion of the turbomachine 26 to define a bypass airflow passage 68 therebetween.

It should be appreciated, however, that the gas turbine engine 20 depicted in FIG. 2 is provided by way of example only, and that in other exemplary embodiments, the gas turbine engine 20 may have other configurations. For example, although the gas turbine engine 20 depicted is configured as a ducted gas turbine engine (e.g., including the outer nacelle 62), in other embodiments, the gas turbine engine 20 may be an unducted or non-ducted gas turbine engine (such that the fan 50 is an unducted fan, and the outlet guide vanes 64 are cantilevered from the outer casing 28).

Additionally, or alternatively, although the gas turbine engine 20 depicted is configured as a geared gas turbine engine (e.g., including the power gear box 58) and a variable pitch gas turbine engine (e.g., including a fan 50 configured as a variable pitch fan), in other embodiments, the gas turbine engine 20 may be configured as a direct drive gas turbine engine (such that the low-pressure shaft 46 rotates at the same speed as the fan 50), as a fixed pitch gas turbine engine (such that the fan 50 includes fan blades 52 that are not rotatable about a pitch axis P), or both. It should also be appreciated that in still other exemplary embodiments, aspects of the present disclosure may be incorporated into any other suitable gas turbine engine. For example, in other exemplary embodiments, aspects of the present disclosure may (as appropriate) be incorporated into, e.g., a turboprop gas turbine engine, a turboshaft gas turbine engine, or a turbojet gas turbine engine.

During operation of the gas turbine engine 20, a volume of air 70 enters the gas turbine engine 20 through an associated inlet 72 of the outer nacelle 62 and fan section 24. As the volume of air 70 passes across the fan blades 52, a first portion of air 74 is directed or routed into the bypass airflow passage 68 and a second portion of air 76 is directed or routed into the working gas flow path 48, or more specifically into the low-pressure compressor 32. The ratio between the first portion of air 74 and the second portion of air 76 is commonly known as a bypass ratio.

As the second portion of air 76 enters the low-pressure compressor 32, one or more sequential stages of low-pressure compressor stator vanes 78 and low-pressure compressor rotor blades 80 coupled to the low-pressure shaft 46, progressively compress the second portion of air 76 flowing through the low-pressure compressor 32 en route to the high-pressure compressor 34. Next, one or more sequential stages of high-pressure compressor stator vanes 82 and high-pressure compressor rotor blades 84 coupled to the high-pressure shaft 44 further compress the second portion of air 76 flowing through the high-pressure compressor 34. This provides compressed air to combustion section 36 where it mixes with fuel and burns to provide combustion gases 86.

The combustion gases 86 are routed through the high-pressure turbine 38 where a portion of thermal and/or kinetic energy from the combustion gases 86 is extracted via sequential stages of high-pressure turbine stator vanes 88 that are coupled to a turbine casing and high-pressure turbine rotor blades 90 that are coupled to the high-pressure shaft 44, thus causing the high-pressure shaft 44 to rotate, thereby supporting operation of the high-pressure compressor 34. The combustion gases 86 are then routed through the low-pressure turbine 40 where a second portion of thermal and kinetic energy is extracted from the combustion gases 86 via sequential stages of low-pressure turbine stator vanes 92 that are coupled to a turbine casing and low-pressure turbine rotor blades 94 that are coupled to the low-pressure shaft 46, thus causing the low-pressure shaft 46 to rotate, and thereby supporting operation of the low-pressure compressor 32 and/or rotation of the fan 50.

Combustion gases 86 are subsequently routed through the jet exhaust nozzle 42 of the turbomachine 26 to provide propulsive thrust. Simultaneously, the pressure of the first portion of air 74 is substantially increased as it is routed through the bypass airflow passage 68 before it is exhausted from a fan nozzle exhaust section 96 of the gas turbine engine 20, also providing propulsive thrust. The high-pressure turbine 38, the low-pressure turbine 40, and the jet exhaust nozzle 42 at least partially define a hot gas path 98 for routing the combustion gases 86 through the turbomachine 26. Each stage of high-pressure turbine stator vanes 88 includes a plurality of nozzle segments, described in more detail below, arranged circumferentially about the longitudinal centerline 22 of the gas turbine engine 20.

Figure 3:
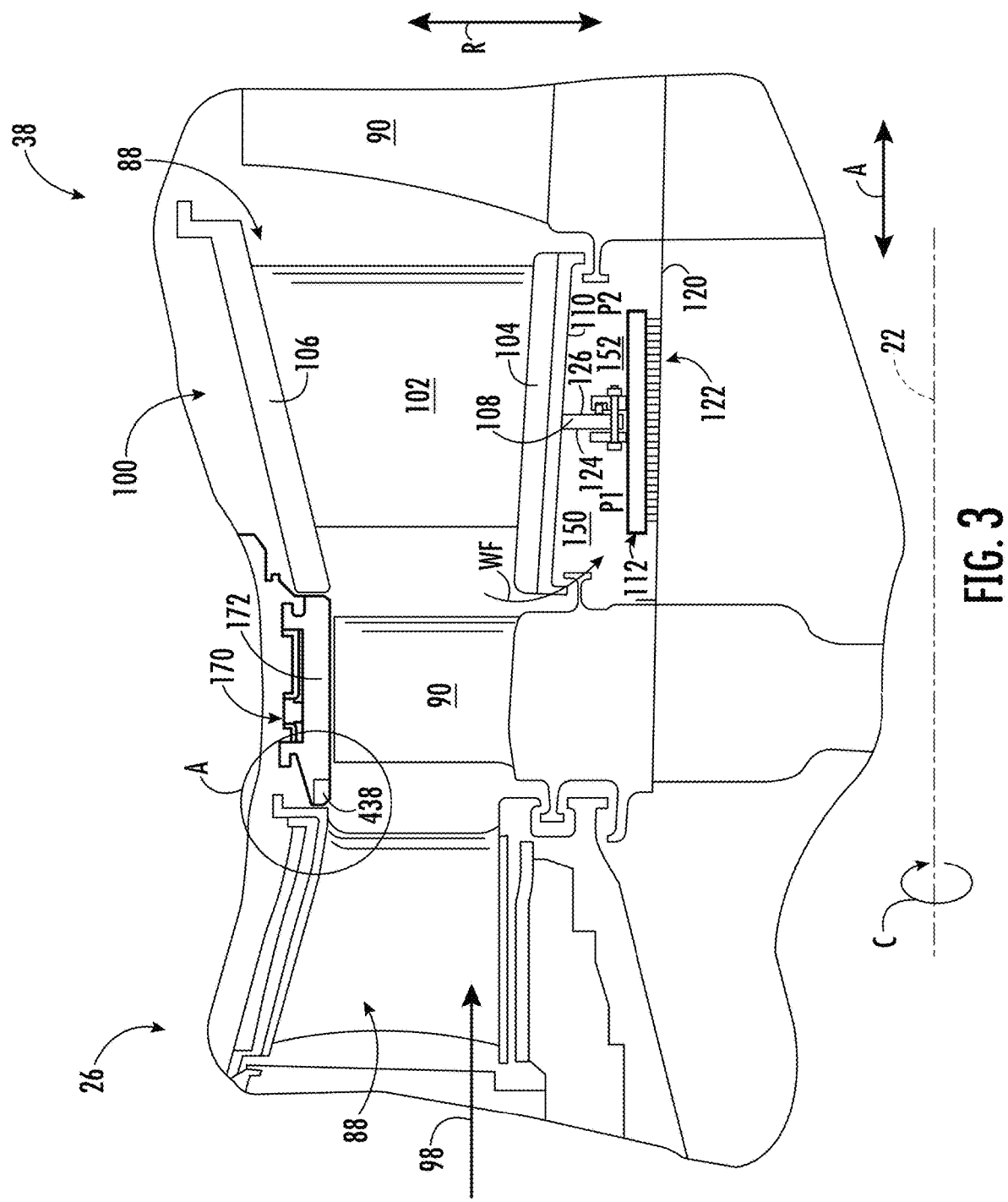
FIG. 3 is an enlarged cross-sectional schematic view of a portion of a high-pressure turbine including high-pressure turbine stator vanes, high-pressure turbine rotor blades, and an exemplary nozzle segment, according to an exemplary embodiment of the present disclosure.

FIG. 3 is an enlarged schematic view of a portion of the high-pressure turbine 38 of the turbomachine 26 including high-pressure turbine stator vanes 88, high-pressure turbine rotor blades 90, and a nozzle segment 100, according to an exemplary embodiment of the present disclosure. It is to be appreciated that although one nozzle segment is shown in FIG. 3, the high-pressure turbine 38 generally includes a plurality of nozzle segments 100 annularly arranged about the longitudinal centerline 22. As shown in FIG. 3, the nozzle segment 100 includes a guide vane 102. Although only one guide vane is shown in FIG. 3, it is to be appreciated that the nozzle segment 100 may include multiple guide vanes spaced circumferentially about the longitudinal centerline 22. As shown in FIG. 3, guide vane 102 extends in radial direction R which is generally perpendicular to longitudinal centerline 22, and in axial direction A which is parallel with longitudinal centerline 22, between an inner shroud 104 and an outer shroud 106. Guide vane 102, the inner shroud 104, and the outer shroud 106 at least partially define the hot gas path 98 through the high-pressure turbine 38.

Figure 4:
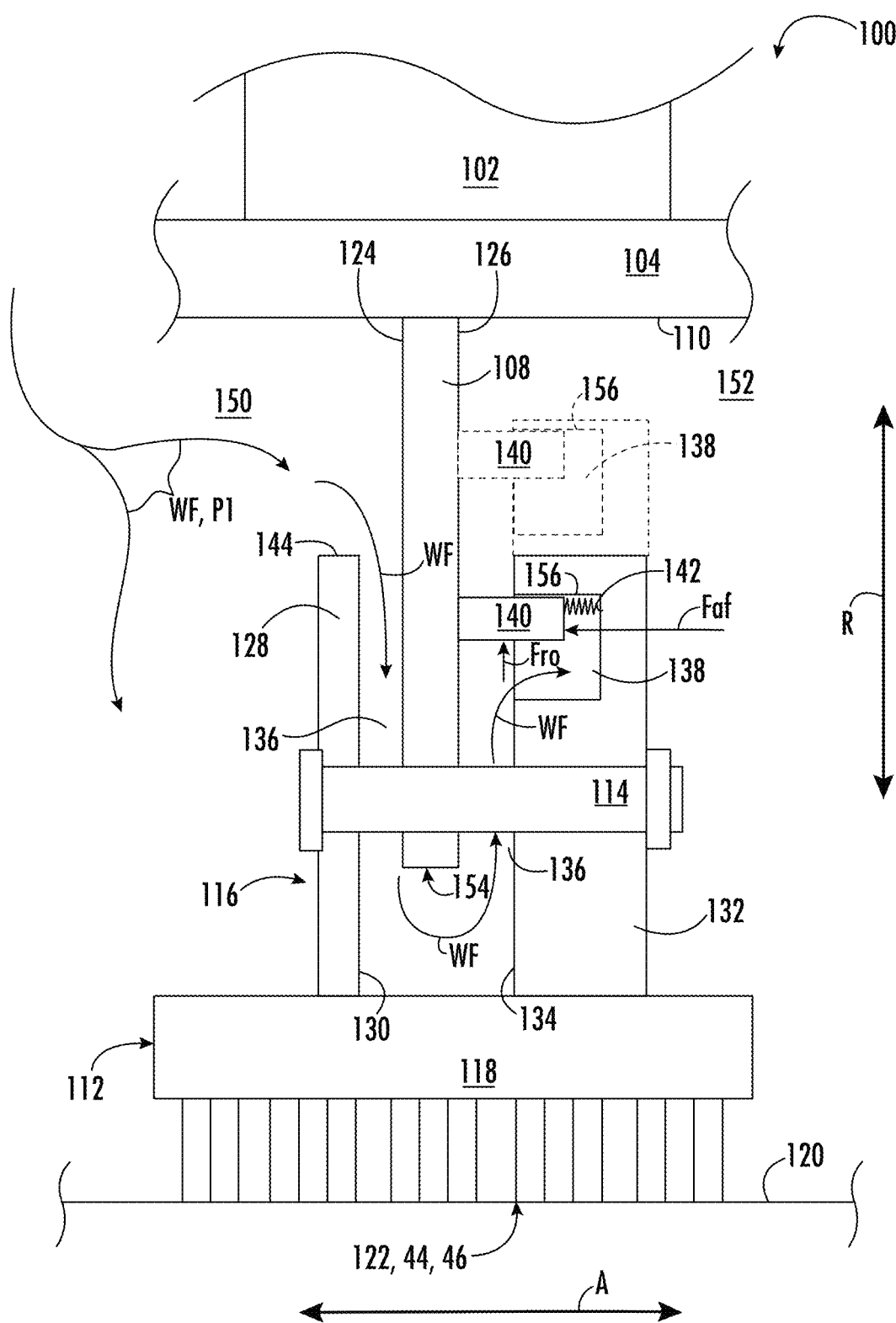
FIG. 4 is an enlarged cross-sectional schematic view of a portion of the nozzle segment shown in FIG. 3 including a portion of a guide vane and an inner shroud, according to an exemplary embodiment of the present disclosure.

FIG. 4 is an enlarged view of a portion of the nozzle segment 100 shown in FIG. 3 including a portion of the guide vane 102 and the inner shroud 104, according to an exemplary embodiment of the present disclosure. As shown in FIG. 4, the nozzle segment 100 includes a nozzle flange 108. The nozzle flange 108 may extend radially inward with respect to radial direction R from a bottom surface 110 of the inner shroud 104. A floating rotor seal 112 is coupled to the nozzle flange 108 via a mechanical fastener 114 such as but not limited to a pin or bolt. The floating rotor seal 112 includes a carrier flange 116 configured or formed to mount to the nozzle flange 108. The floating rotor seal 112 may also include or define a seal block 118 configured or formed to seal against an outer surface 120 of a rotor shaft 122 such as the high-pressure shaft 44 or the low-pressure shaft 46 shown in FIG. 2.

As shown in FIG. 4, nozzle flange 108 defines a forward side surface 124 and an aft side surface 126. The carrier flange 116 is formed or shaped to receive at least a portion of the nozzle flange 108. In the exemplary embodiment shown, carrier flange 116 includes a forward wall 128 defining an aft-facing surface 130, and an aft wall 132 defining a forward-facing surface 134. Mechanical fastener 114 may extend through the forward wall 128, the nozzle flange 108, and the aft wall 132 to couple the floating rotor seal 112 to the nozzle flange 108. The aft-facing surface 130 of the forward wall 128, the forward side surface 124 of the nozzle flange 108, the forward-facing surface 134 of the aft wall 132, and the aft side surface 126 of the nozzle flange 108 at least partially define a flowpath 136 therebetween.

In the exemplary embodiment shown in FIG. 4, the aft wall 132 defines a seal pocket 138 defined along the forward-facing surface 134. A linear seal segment 140 is partially disposed within seal pocket 138. In exemplary embodiments, as shown in FIG. 4, a biasing member 142, such as but not limited to, a wave spring, may be at least partially disposed in the seal pocket 138. The biasing member 142 may be in contact with the linear seal segment 140 in a manner to provide an axial force or "axially acting force" with respect to axial direction A, a radial force or "radially acting force" with respect to radial direction R, or both an axial force and a radial force against the linear seal segment 140. The biasing member 142 may bias the linear seal segment 140 towards the forward-facing surface 134 of the aft wall 132.

In an exemplary embodiment, as illustrated in dashed lines in FIG. 4, the seal pocket 138 may be radially offset with respect to radial direction R from a top surface 144 of the forward wall 128 of the carrier flange 116. In other words, the aft wall 132 may be higher or taller than the forward wall 128 in the radial direction R. This configuration may allow for improved manufacturing of the carrier flange 116, and formation of the seal pocket 138.

Figure 5:
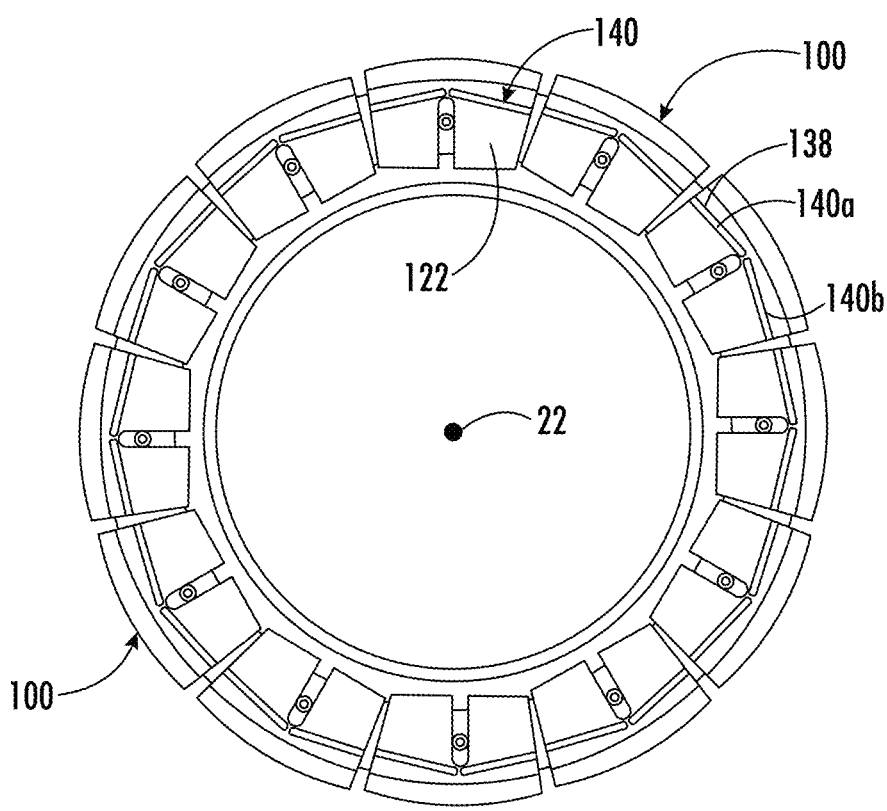
FIG. 5 is an aft-looking-forward view of a plurality of nozzle segments annularly arranged about a longitudinal centerline, according to an exemplary embodiment of the present disclosure.

FIG. 5 provides an aft-looking-forward view of a plurality of nozzle segments 100 annularly arranged about the longitudinal centerline 22 with the guide vane, outer shroud, and floating rotor seal removed for clarity, according to the exemplary embodiment shown in FIG. 4. As shown in FIG. 5, each nozzle segment 100 may include at least one linear seal segment 140 at least partially disposed in a respective seal pocket 138. For example, in an exemplary embodiment, each nozzle segment 100 includes two linear seal segments 140a, 140b. Referring to FIGS. 4 and 5 collectively, linear seal segment 140 may be formed to extend linearly between the forward-facing surface 134 of the aft wall 132 and the aft side surface 126 of the nozzle flange 108.

Figure 6:
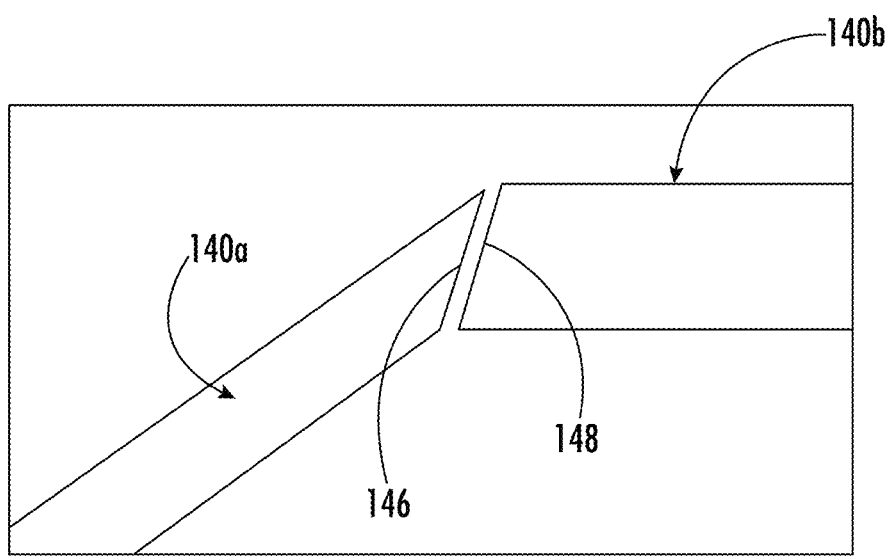
FIG. 6 is a cross-sectional schematic view of a portion of a first linear seal segment and a portion of a second linear seal segment according to an embodiment of the present disclosure.

FIG. 6 provides a schematic view of a portion of linear seal segment 140a and a portion of linear seal segment 140b according to an embodiment of the present disclosure. As shown in FIG. 6, an end 146 of linear seal segment 140a may be formed or shaped to at least partially overlap with an adjacent end 148 of linear seal segment 140b.

Referring back to FIGS. 3 and 4 collectively, a first pressure plenum 150 is at least partially defined between the outer surface 120 of the rotor shaft 122, the bottom surface 110 of the inner shroud 104, the forward side surface 124 of the nozzle flange 108 of the nozzle segment 100, and the floating rotor seal 112. A second pressure plenum 152 is at least partially defined between the outer surface 120 of the rotor shaft 122, the bottom surface 110 of the inner shroud 104, the aft side surface 126 of the nozzle flange 108, and the floating rotor seal 112.

In operation, as shown in FIGS. 3 and 4 collectively, a working fluid (WF) enters the first pressure plenum 150 at a first pressure (P1). The working fluid WF may at least partially include combustion gases 86 or compressed air. The second pressure plenum 152 is at a second pressure (P2) that is lower than the first pressure P1. A portion of the working fluid WF flows into the flowpath 136, around an end portion 154 of the nozzle flange 108 and into the seal pocket 138.

As shown in FIG. 4, the working fluid WF pressurizes the seal pocket 138 and exerts a radially outward force (Fro) with respect to radial direction R against the linear seal segment 140, thereby seating the linear seal segment 140 against an upper surface 156 of the seal pocket 138. In addition, or in the alternative, the working fluid WF exerts a forward axial force (Faf) with respect to axial direction A against the linear seal segment 140, thereby pressing the linear seal segment 140 against the aft side surface 126 of the nozzle flange 108 and creating a seal therebetween. The linear seal segment 140 prevents or impedes leakage or flow of the working fluid WF from the first pressure plenum 150 to the second pressure plenum 152.

Figure 7:
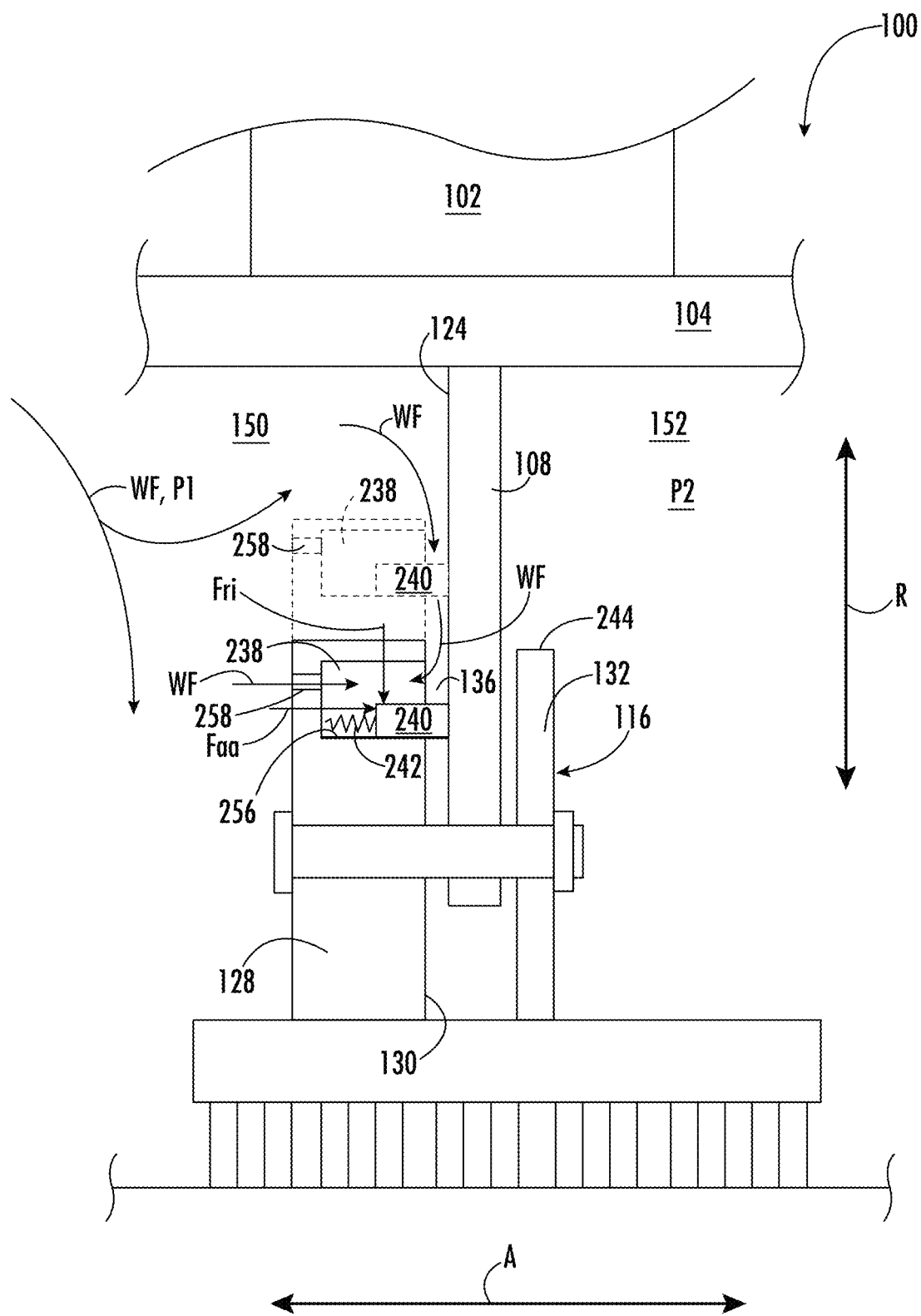
FIG. 7 is an enlarged cross-sectional schematic view of a portion of an exemplary nozzle segment including a portion of a guide vane and an inner shroud, according to an exemplary embodiment of the present disclosure.

FIG. 7 is an enlarged view of a portion of the nozzle segment 100 including a portion of the guide vane 102 and the inner shroud 104, according to another exemplary embodiment of the present disclosure. As shown in FIG. 7, forward wall 128 defines a seal pocket 238 defined along the aft-facing surface 130. A linear seal segment 240 is partially disposed within seal pocket 238. In exemplary embodiments, as shown in FIG. 7, a biasing member 242, such as but not limited to, a wave spring, may be at least partially disposed in the seal pocket 238. The biasing member 242 may be in contact with the linear seal segment 240 in a manner to provide an axial force with respect to axial direction A, a radial force with respect to radial direction R, or both an axial force and a radial force against the linear seal segment 240. In certain embodiments, forward wall 128 may define at least one passage 258 that defines a flow path for fluid communication between the first pressure plenum 150 and the seal pocket 238.

In an exemplary embodiment, as illustrated in dashed lines in FIG. 7, the seal pocket 238 may be radially offset with respect to radial direction R from a top surface 244 of the aft wall 132 of the carrier flange 116. In other words, the forward wall 128 may be higher or taller than the aft wall 132 in the radial direction R. This configuration may allow for improved manufacturing of the carrier flange 116, and formation of the seal pocket 238.

In operation, as shown in FIG. 7, working fluid WF enters the first pressure plenum 150 at the first pressure P1. The working fluid WF may at least partially include combustion gases 86 or compressed air. The second pressure plenum 152 is at the second pressure P2 which is lower than the first pressure P1. A portion of the working fluid WF flows into the flowpath 136 and into the seal pocket 238. The working fluid WF pressurizes the seal pocket 238 and exerts a radially inward force (Fri) with respect to radial direction R against the linear seal segment 240, thereby seating the linear seal segment 240 against a lower surface 256 of the seal pocket 238. In addition, or in the alternative, the working fluid WF exerts an aft axial force (Faa) with respect to axial direction A against the linear seal segment 240, thereby pressing the linear seal segment 240 against the forward side surface 124 of the nozzle flange 108 and creating a seal therebetween. Linear seal segment 240 prevents or impedes leakage or flow of the working fluid WF from the first pressure plenum 150 to the second pressure plenum 152.

Figure 8:
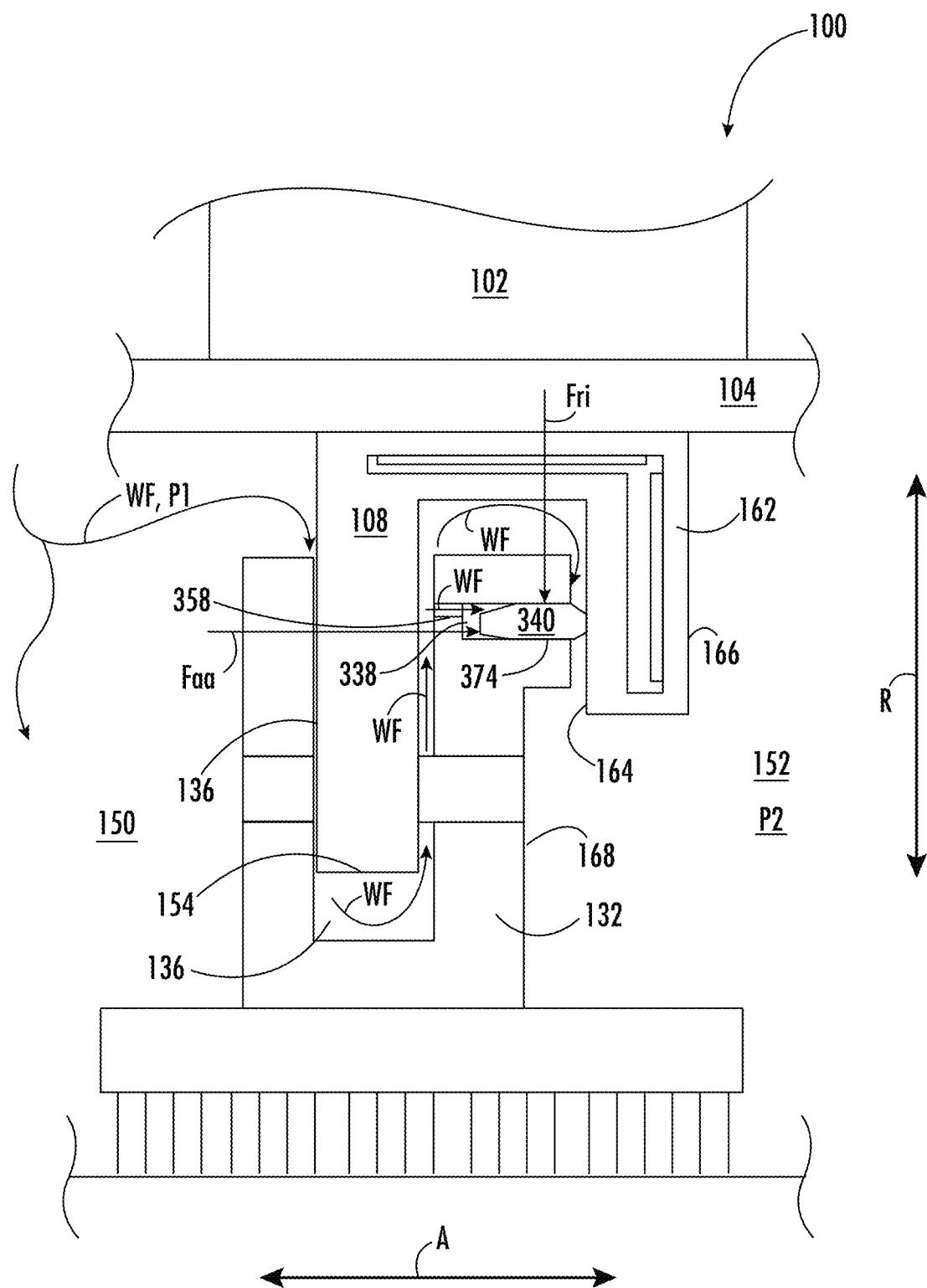
FIG. 8 is an enlarged cross-sectional schematic view of a portion of an exemplary nozzle segment, according to an exemplary embodiment of the present disclosure.

FIG. 8 is an enlarged view of a portion of the nozzle segment 100 including a portion of the guide vane 102 and the inner shroud 104, according to another exemplary embodiment of the present disclosure. As shown in FIG. 8, nozzle flange 108 may include a secondary flange 162. The secondary flange 162 defines a forward face 164 and an aft face 166. The aft wall 132 defines a seal pocket 338 along an aft surface 168 of the aft wall 132. A linear seal segment 340 is partially disposed within seal pocket 338. In certain embodiments, aft wall 132 may define at least one passage 358 that defines a flow path for fluid communication between the first pressure plenum 150 and the seal pocket 338.

In operation, as shown in FIG. 8, working fluid WF enters the first pressure plenum 150 at the first pressure P1. The working fluid WF may at least partially include combustion gases 86 or compressed air. The second pressure plenum 152 is at the second pressure P2 which is lower than the first pressure P1. A portion of the working fluid WF flows into the flowpath 136, around the end portion 154 of the nozzle flange 108 and into the seal pocket 338. The working fluid WF pressurizes the seal pocket 338 and exerts a radially inward acting force (Fri) with respect to radial direction R against the linear seal segment 340, thereby seating the linear seal segment 340 against a lower surface 374 of the seal pocket 338. In addition, or in the alternative, the working fluid WF exerts an aft acting axial force (Faa) with respect to axial direction A against the linear seal segment 340, thereby pressing the linear seal segment 340 against the forward face 164 of secondary flange 162 of the nozzle flange 108 and creating a seal therebetween. The linear seal segment 340 prevents or impedes leakage or flow of the working fluid WF from the first pressure plenum 150 to the second pressure plenum 152.

Figure 9:
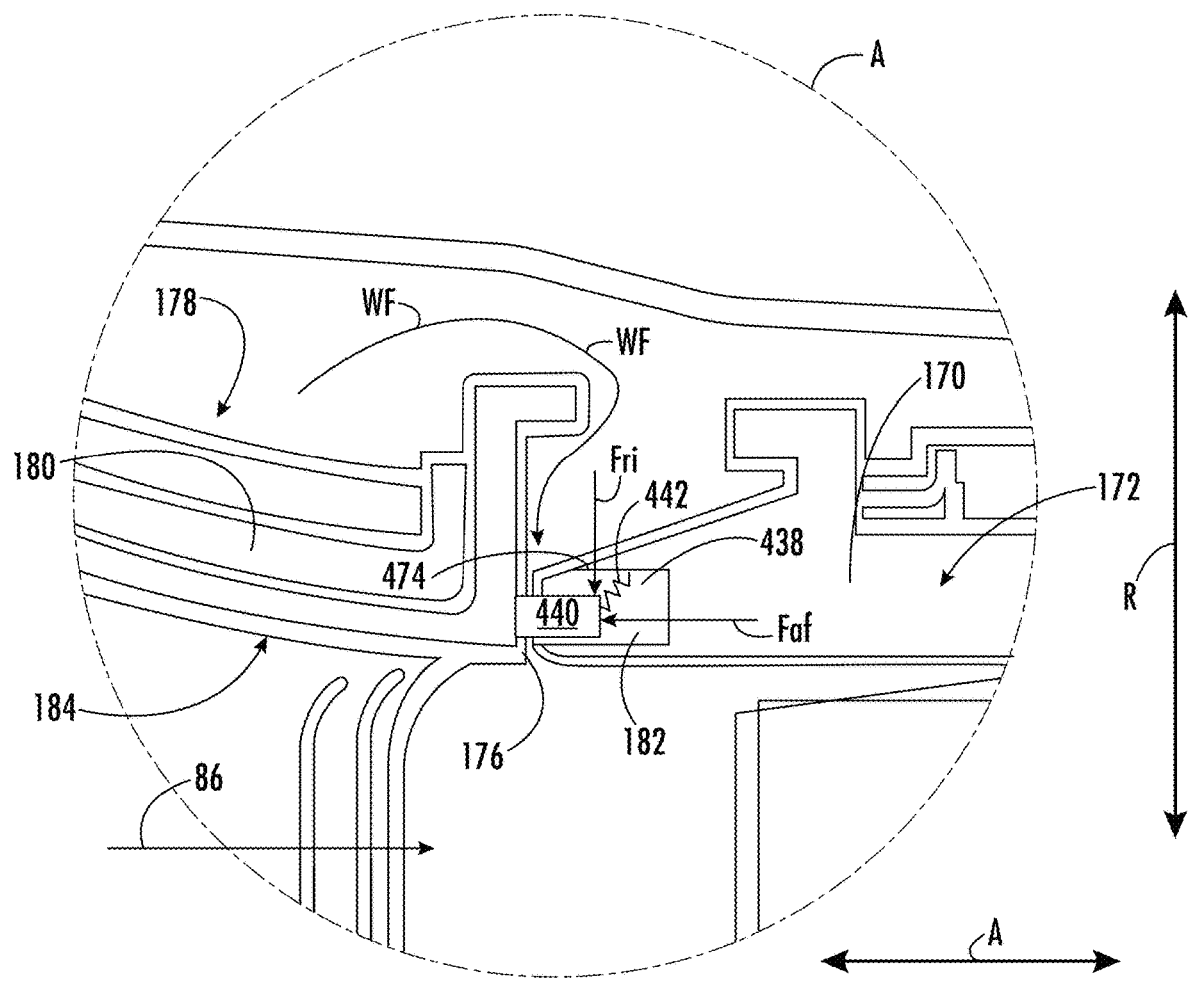
FIG. 9 is an enlarged cross-sectional schematic view of a portion of a high-pressure turbine as indicated by circle (A) in FIG. 3, according to exemplary embodiments of the present disclosure.

In an exemplary embodiment, as shown in FIG. 3, a seal pocket 438 may be formed in a first stationary component 170 such as a turbine blade shroud 172. The turbine blade shroud 172 circumferentially surrounds a respective row of the high-pressure turbine rotor blades 90. FIG. 9 is an enlarged view of a portion of the high-pressure turbine 38 as indicated by circle (A) in FIG. 3, according to exemplary embodiments of the present disclosure. As shown in FIG. 9, the seal pocket 438 is positioned along a surface 474 of the first stationary component 170 and is oriented towards a sealing surface 176 of a second stationary component 178 that is axially adjacent to the first stationary component. The second stationary component may include an outer shroud 180 of an axially adjacent high-pressure turbine stator vane 184.

A linear seal segment 440 is at least partially disposed within seal pocket 438 and extends towards the sealing surface 176 of the second stationary component 178. In particular embodiments, a biasing member 442 such as but not limited to, a wave spring, may be at least partially disposed in the seal pocket 438. The biasing member 442 may be in contact with the linear seal segment 440 in a manner to provide an axial force with respect to axial direction A, a radial force with respect to radial direction R, or both an axial force and a radial force against the linear seal segment 440. The biasing member 442 may bias the linear seal segment 440 towards the sealing surface 176 of the second stationary component 178.

In operation, as shown in FIG. 9, working fluid WF such as compressed air from the high-pressure compressor 34 (FIG. 2) flows into and pressurizes the seal pocket 438 and exerts a radially inward acting force (Fri) with respect to radial direction R against the linear seal segment 440, thereby sealing the linear seal segment 440 against a surface 182 of the seal pocket 438. In addition, or in the alternative, the working fluid WF exerts a forward acting axial force (Faf) with respect to axial direction A against the linear seal segment 440, thereby pressing the linear seal segment 440 against the sealing surface 176 of the second stationary component 178 and creating a seal therebetween. In this configuration, linear seal segment 440 may prevent combustion gases 86 from the hot gas path 98 from leaking between the first stationary component 170 and the second stationary component 178 respectively, and into areas outside of the hot gas path 98.

Figure 10:
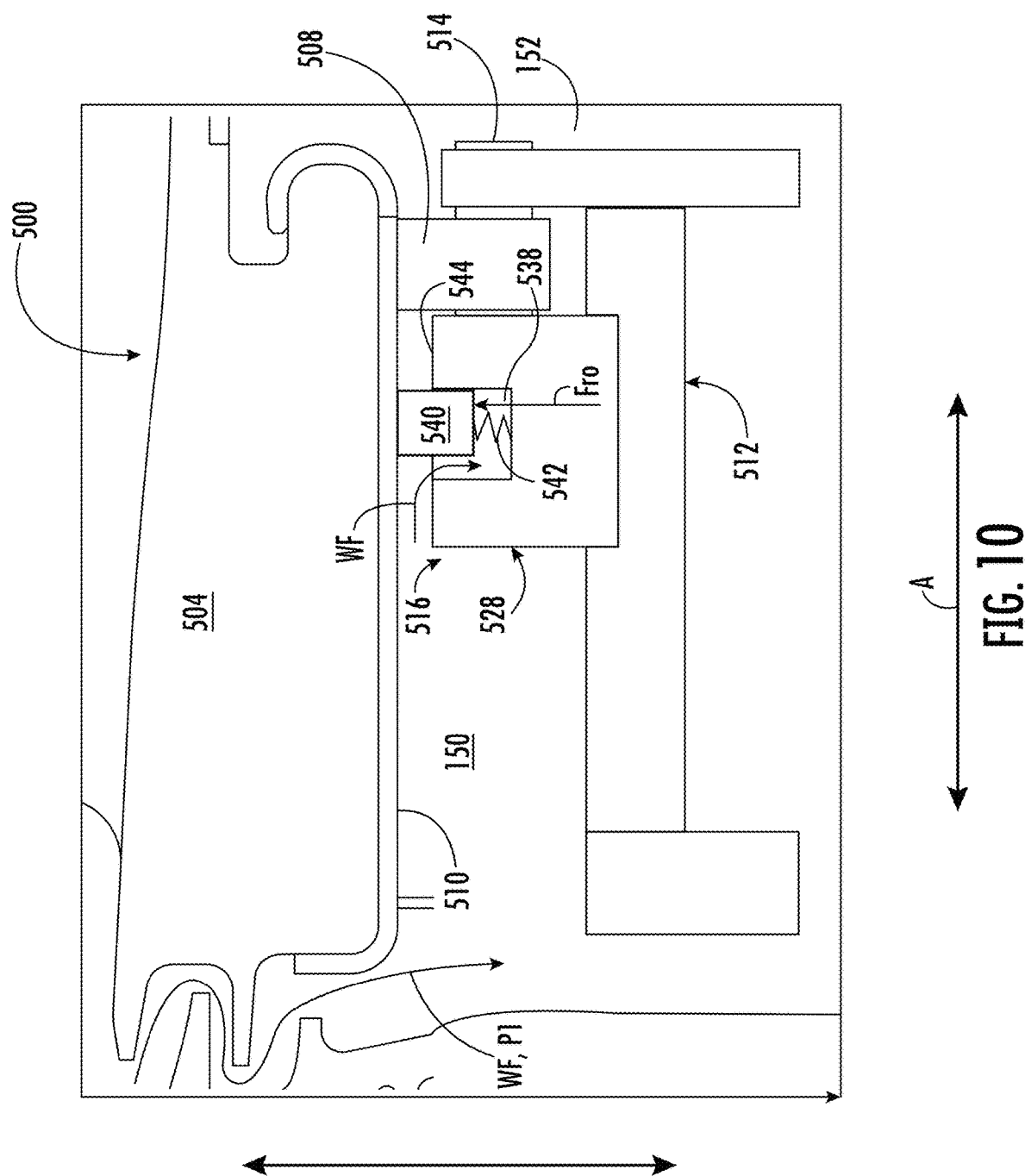
FIG. 10 is an enlarged cross-sectional schematic view of a portion of a high-pressure turbine including a portion of an exemplary nozzle segment, according to an exemplary embodiment of the present disclosure.

FIG. 10 provides a schematic view of a portion of the high-pressure turbine including a portion of a nozzle segment 500, according to an exemplary embodiment of the present disclosure. As shown in FIG. 10, the nozzle segment includes a nozzle flange 508 that extends radially inward with respect to radial direction R from a bottom surface 510 of an inner shroud 504 of the nozzle segment 500. A floating rotor seal 512 is coupled to a nozzle flange 508 via a carrier flange 516. In particular embodiments, a mechanical fastener 514, such as but not limited to, a pin or bolt, may couple the carrier flange 516 to the nozzle flange 508. The carrier flange 516 includes a forward wall 528 defining a top surface 544.

The forward wall 528 defines a seal pocket 538 disposed along the top surface 544 and oriented towards the bottom surface 510 of the inner shroud 504. A linear seal segment 540 is at least partially disposed within the seal pocket 538. In exemplary embodiments a biasing member 542 such as but not limited to, a wave spring, may be at least partially disposed in the seal pocket 538. The biasing member 542 may be in contact with the linear seal segment 540 in a manner to provide a radial force with respect to radial direction R. The biasing member 542 may bias the linear seal segment 540 towards the bottom surface 510 of the inner shroud 506 of the nozzle segment 500.

In operation, as shown in FIG. 10, working fluid WF enters the first pressure plenum 150 at the first pressure P1. The working fluid WF may at least partially include combustion gases 86 or compressed air. The second pressure plenum 152 is at the second pressure P2 which is lower than the first pressure P1. A portion of the working fluid WF flows into and pressurizes the seal pocket 538. The working fluid WF exerts a radially outward acting force (Fro) with respect to radial direction R against the linear seal segment 540, thereby seating the linear seal segment 540 against the bottom surface 510 of the inner shroud 506 of the nozzle segment 500. The linear seal segment 540 prevents or impedes leakage or flow of the working fluid WF from the first pressure plenum 150 to the second pressure plenum 152.

Further aspects are provided by the subject matter of the following clauses:

A turbomachine, comprising: a nozzle segment including an inner shroud defining a bottom surface, and a nozzle flange defining a forward side surface and an aft side surface; and a floating rotor seal coupled to the nozzle flange via a carrier flange, wherein the carrier flange comprises: a forward wall and an aft wall, wherein the nozzle flange is positioned between the forward wall and the aft wall, and wherein a flowpath is defined between the forward wall, the nozzle flange, and the aft wall; a seal pocket defined in one of the forward wall or the aft wall, wherein the seal pocket is in fluid communication with the flowpath; and at least one linear seal segment partially disposed within the seal pocket, wherein the at least one linear seal segment forms a seal against the nozzle flange or the bottom surface in response to pressurization of the seal pocket via a working fluid in the flowpath.

The turbomachine of any preceding or following clause, wherein the forward wall defines an aft-facing surface oriented towards the forward side surface of the nozzle flange, wherein the seal pocket is defined along the aft-facing surface.

The turbomachine of any preceding or following clause, wherein the seal pocket is radially offset from a top surface of the forward wall.

The turbomachine of any preceding or following clause, wherein the aft wall defines a forward-facing surface oriented towards the aft side surface of the nozzle flange, wherein the seal pocket is defined along the forward-facing surface.

The turbomachine of any preceding or following clause, wherein the seal pocket is radially offset from a top surface of the aft wall.

The turbomachine of any preceding or following clause, wherein the nozzle flange includes a secondary flange defining a forward face and an aft face, wherein the aft wall of the carrier flange defines an aft surface, wherein the seal pocket is defined along the aft surface of the aft wall, and wherein the seal pocket is oriented towards the forward face of the secondary flange.

The turbomachine of any preceding or following clause, wherein the seal pocket is defined along the top surface of the forward wall and is oriented towards the bottom surface of the inner shroud.

The turbomachine of any preceding or following clause, wherein the at least one liner seal segment comprises a first linear seal segment and a second linear seal segment at least partially disposed in the seal pocket.

The turbomachine of any preceding or following clause, wherein an end of the first linear seal segment overlaps with an adjacent end of the second linear seal segment.

The turbomachine of any preceding or following clause, wherein the at least one linear seal segment comprises a plurality of linear seal segments annularly arranged about a longitudinal centerline of the turbomachine.

The turbomachine of any preceding or following clause, further comprising a biasing member disposed within the seal pocket, wherein the biasing member is configured to exert at least one of a radially acting force and an axial acting force against the at least one linear seal segment.

The turbomachine of any preceding or following clause, wherein the biasing member is a wave spring.

The turbomachine of any preceding or following clause, further comprising a rotor shaft having an outer surface, wherein the nozzle flange and the floating rotor seal are disposed between the inner shroud and the outer surface of the rotor shaft.

The turbomachine of any preceding or following clause, wherein the inner shroud, the nozzle flange, the floating rotor seal, and the rotor shaft at least partially define a first pressure plenum and a second pressure plenum.

The turbomachine of any preceding or following clause, wherein the at least one linear seal segment is configured to prevent flow of the working fluid from the first pressure plenum to second pressure plenum.

The turbomachine of any preceding or following clause, wherein the working fluid fills the first pressure plenum at a first pressure that is higher than a second pressure of the second pressure plenum.

A gas turbine engine, comprising: a turbomachine including a high-pressure turbine and a working fluid flowing through the high-pressure turbine, wherein the high-pressure turbine comprises: a first stationary component defining a seal pocket; a second stationary component axially adjacent to the first stationary component with respect to a longitudinal centerline of the turbomachine, the second stationary component defining a sealing surface oriented towards the seal pocket; and a linear seal segment partially disposed within the seal pocket, wherein the linear seal segment forms a seal against the sealing surface of the secondary stationary component in response to pressurization of the seal pocket via the working fluid.

The gas turbine engine of any preceding or following clause, wherein the first stationary component is an outer shroud of a nozzle segment, and the second stationary component is a turbine rotor blade shroud.

The gas turbine engine of any preceding or following clause, wherein the turbomachine further comprises a biasing member, wherein the biasing member is configured to exert at least one of a radially acting force and an axial acting force against the at least one linear seal segment.

The gas turbine engine of any preceding or following clause, wherein the biasing member is a wave spring.

A method for sealing a first pressure plenum from a second pressure plenum of a turbomachine. The method comprising pressurizing a seal pocket with a compressed working fluid at a first pressure, wherein the compressed working fluid exerts a radially outward acting force with respect to a radial direction against the linear seal segment, seating the linear seal segment against a bottom surface of an inner shroud of a nozzle segment of the turbomachine via the radially outward acting force, wherein the linear seal segment prevents or impedes leakage or flow of the compressed working fluid from the first pressure plenum to the second pressure plenum of the turbomachine.

A method for sealing a first pressure plenum from a second pressure plenum of a turbomachine. The method comprising pressurizing a seal pocket with a compressed working fluid at a first pressure, wherein the compressed working fluid exerts a radially inward acting force with respect to a radial direction against a linear seal segment disposed within the seal pocket, seating the linear seal segment against a lower surface of the seal pocket via the compressed working.

The method for sealing a first pressure plenum from a second pressure plenum of a turbomachine of the preceding clause, wherein the compressed working fluid exerts an aft acting axial force with respect to an axial direction against the linear seal segment, thereby pressing the linear seal segment against a forward face of a secondary flange of a nozzle flange.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A turbomachine, comprising:
    a nozzle segment including an inner shroud defining a bottom surface, and a nozzle flange defining a forward side surface and an aft side surface; and
    a floating rotor seal coupled to the nozzle flange via a carrier flange, wherein the carrier flange comprises:
    a forward wall and an aft wall, wherein the nozzle flange is positioned between the forward wall and the aft wall, and wherein a flowpath is defined between the forward wall, the nozzle flange, and the aft wall;
    a seal pocket defined in one of the forward wall or the aft wall, wherein the seal pocket is in fluid communication with the flowpath; and
    at least one linear seal segment partially disposed within the seal pocket, wherein the at least one linear seal segment forms a seal against the nozzle flange or the bottom surface in response to pressurization of the seal pocket via a working fluid in the flowpath.

2. The turbomachine of claim 1, wherein the forward wall defines an aft-facing surface oriented towards the forward side surface of the nozzle flange, wherein the seal pocket is defined along the aft-facing surface.

3. The turbomachine of claim 2, wherein the seal pocket is radially offset from a top surface of the forward wall.

4. The turbomachine of claim 1, wherein the aft wall defines a forward-facing surface oriented towards the aft side surface of the nozzle flange, wherein the seal pocket is defined along the forward-facing surface.

5. The turbomachine of claim 4, wherein the seal pocket is radially offset from a top surface of the aft wall.

6. The turbomachine of claim 1, wherein the forward wall of the carrier flange defines a top surface, and wherein the seal pocket is defined along the top surface of the forward wall and is oriented towards the bottom surface of the inner shroud.

7. The turbomachine of claim 1, wherein the at least one linear seal segment comprises a first linear seal segment and a second linear seal segment at least partially disposed in the seal pocket.

8. The turbomachine of claim 7, wherein an end of the first linear seal segment overlaps with an adjacent end of the second linear seal segment.

9. The turbomachine of claim 1, wherein the at least one linear seal segment comprises a plurality of linear seal segments annularly arranged about a longitudinal centerline of the turbomachine.

10. The turbomachine of claim 1, further comprising a biasing member disposed within the seal pocket, wherein the biasing member is configured to exert at least one of a radially acting force and an axial acting force against the at least one linear seal segment.

11. The turbomachine of claim 10, wherein the biasing member is a wave spring.

12. The turbomachine of claim 1, further comprising a rotor shaft having an outer surface, wherein the nozzle flange and the floating rotor seal are disposed between the inner shroud and the outer surface of the rotor shaft.

13. The turbomachine of claim 12, wherein the inner shroud, the nozzle flange, the floating rotor seal, and the rotor shaft at least partially define a first pressure plenum and a second pressure plenum.

14. The turbomachine of claim 13, wherein the at least one linear seal segment is configured to prevent a flow of the working fluid from the first pressure plenum to the second pressure plenum.

15. The turbomachine of claim 13, wherein the working fluid fills the first pressure plenum at a first pressure that is higher than a second pressure of the second pressure plenum.

\* \* \* \* \*